United States Patent [19]

Matsuda et al.

[11] 3,852,227

[45] Dec. 3, 1974

[54] PHOTO-DEGRADABLE POLYOLEFIN RESIN COMPOSITION

[75] Inventors: Hisayuki Matsuda, Kyoto; Hirohumi Mori, Osaka; Hajime Matoba, Nara, all of Japan

[73] Assignee: Sekisui Kagaku Kogyo Kabushiki Kaisha, Osaka, Japan

[22] Filed: Dec. 27, 1972

[21] Appl. No.: 318,777

[30] Foreign Application Priority Data

Dec. 28, 1971 Japan................................. 47-2182

[52] U.S. Cl. ....... 260/23 H, 220/DIG. 30, 260/23 S, 260/32.8 A, 260/94.9 GC, 260/DIG. 43
[51] Int. Cl. ............................................. C08f 45/00
[58] Field of Search...... 260/DIG. 43, 23 H, 32.8 A, 260/23 S, 94.9 GC

[56] References Cited

UNITED STATES PATENTS

| | | | |
|---|---|---|---|
| 3,454,510 | 7/1969 | Newland et al........................ | 260/23 |
| 3,647,111 | 3/1972 | Stager et al........................ | 260/94.9 |
| 3,679,777 | 7/1972 | Lambert............................ | 260/94.9 |

FOREIGN PATENTS OR APPLICATIONS

| | | | |
|---|---|---|---|
| 38,687 | 11/1971 | Japan................................ | 260/94.9 |

OTHER PUBLICATIONS

Chem. Abstracts, Vol. 68, p. 7665, 1968.

"Mechanisms of Oxidation of Organic Compounds," by Emeleus et al., Methuen & Co., London, 1964, p. 13–14.

Autoxidation and Autoxidants, Vol. II, by Lundberg, Interscience Pub., N.Y., 1964, p. 687–689.

Light–Sensitive Systems by Kosar, John Wiley & Sons, N.Y., 1965, p. 143–146.

*Primary Examiner*—Melvyn I. Marquis
*Assistant Examiner*—Eugene C. Rzucidlo
*Attorney, Agent, or Firm*—Sherman & Shalloway

[57] ABSTRACT

A photo-degradable polyolefin composition comprising (A) a polyolefin and (B) a photo-degrading agent consisting of (a) at least one specific carbonyl compound, such as benzophenone compound, anthraquinone compound, phenylalkylketone compound, indanone compound and indanedione compound and (b) at least one compound selected from the group consisting of aliphatic carboxylic acids, and zinc, magnesium, aluminum, calcium and barium salts of aliphatic carboxylic acids.

15 Claims, No Drawings

PHOTO-DEGRADABLE POLYOLEFIN RESIN COMPOSITION

This invention relates to a photo-degradable polyolefin resin composition which will readily be degraded and disintegrated under exposure to sunlight or ultraviolet rays.

In general, when synthetic resins are left to stand under influences of nature, they deteriorate only with difficulty by efflorescing actions such as oxidation and ozonization or by putrefaction by microorganisms. Accordingly, synthetic resin articles such as plastic containers, bags, foams and other shaped articles still retain original forms even after they became disused and they have been left under influences of nature for a long period of time. For this reason, disposal of such disused articles of synthetic resins involves various difficulties. In the present "age of plastics", plastic articles are utilized in any field of modern living, and disposal of disused plastic articles has now become one of society's great problems. For instance, waste materials collected from households in cities or towns are thrown away in rivers, waste lands, reclaimed lands and the like, but great quantities of disused synthetic resin articles contained in these waste articles still retain their original forms without undergoing deterioration, even after other waste materials have deteriorated and disintegrated. This phenomenon results in various social troubles such as industrial, sanitary and scenery-defiling troubles. If waste articles of synthetic resins are collected separately from other waste articles and only synthetic resin articles are disposed in some way or other, it includes various difficulties. For instance, collection of such synthetic resin articles requires much labor and time. In case they are burnt up in incineration furnaces, black smokes or poisonous gases are inevitably generated. Further, in some synthetic resins, high temperatures are generated during the burning treatment, which results in extreme shortening of life of an incineration furnace.

Recently, various attempts have been made to solve these problems involved in disposal of waste articles of synthetic resins, and especially with respect to waste articles of polyolefins such as polyethylene, which are used in various fields, resinous compositions comprising a polyolefin and a specific polyolefin-decomposing, photosensitizing additive have been proposed as polyolefin resin compositions readily degradable and disintegrable under natural environmental conditions. For instance, U.S. Pat. No. 3,454,510 to Gordon C. Newland et al. discloses a polyolefin composition comprising a polyolefin, an opaquing agent and at least one pro-oxidant selected from organic transition metal compounds such as acetyl acetonates, alkyl acetoacetates and alkyl benzoylacetates of such transition metals as manganese, cobalt, chromium, iron, copper and vanadium, and stearates and oleates of manganese and cobalt. Further, Japanese Patent Publication No. 38687/71 discloses a polyolefin resin composition containing as a photo-sensitizing agent such a ketone compound as diphenylketone, phenylbenzylketone and phenylpentadecylketone.

Transition metal compounds proposed as pro-oxidants are effective as agents for promoting the photo-degradation in polyolefin resins, but deterioration or degradation of polyolefin resins by factors other than light is also promoted by the presence of these transition metal compounds. Therefore, polyolefin resins incorporated with such transition metal compounds are readily thermally decomposed during the molding step and the resins are degraded. Thus, use of such transition metal compounds invites another new problem about the heat stability. Further, even when molded articles of polyolefin resins incorporated with such transition metal compounds are stored under interception of sunlight or ultraviolet rays, the oxidative decomposition of polyolefin resins by oxygen in air or the like is promoted by the presence of these transition metal compounds, and hence, there is a fear that properties of the molded articles will be deteriorated before their actual use. This is another defect involved in the use of such transition metal compounds. In addition, transition metal compound have, in general, a specific dense color inherent of the transition metal. Accordingly, when these transition metal compounds are incorporated in polyolefin resins, molded articles prepared therefrom are usually colored. Therefore, such molded articles cannot be used in fields where coloration is not desired. Moreover, many of the transition metal compounds have a toxicity to living bodies, especially men, and therefore, polyolefin compositions incorporated with such transition metal compounds cannot be used as tablewares and packaging materials for foodstuffs. Accordingly, even if such compositions are used in other fields, it is required to reduce amounts of the transition metal compounds as pro-oxidants and when they are incorporated in too small amounts, a satisfactory photo-degrading effect cannot be attained. For the foregoing reasons, the transition metal compounds disclosed in the above quoted U.S. Patent have little utility as photo-degrading agents for polyolefin resins.

On the other hand, such photo-sensitizing agents as diphenylketone and phenylbenzoylketone are relatively poor in the photo-degradation-promoting activity, and in order to impart practically sufficient photo-degradability to polyolefin resins, it is necessary to incorporate these photo-sensitizers in relatively great amounts. However, since these photo-sensitizers are generally expensive, if these photo-sensitizers are incorporated in large amounts, costs of resulting polyolefin resin compositions become high and their practical utility decreases. Still further, these photo-sensitizing agents are generally insufficient in compatibility with polyolefin resins. Therefore, if these photo-sensitizing agents are incorporated in great amounts, such undesired phenomena as phase separation and bleeding are frequently caused to occur, resulting in reduction of physical properties of the resulting resin composition. Still in addition, since these photo-sensitizing agents have, in general, a strong aromatic smell, their application fields are extremely restricted. For these reasons, it is not desired that such photo-sensitizing agents are incorporated in polyolefin resins in great amounts. Thus, whether such compounds as diphenylketone and phenylbenzoylketone may be used as photo-sensitizing agents or photo-degradation-promoting agents, it is indispensable that amounts of these compounds should be reduced. However, if they are used in small amounts, the intended effect of promoting the photo-degradation in polyolefin resins is drastically lowered. For this fatal defect, these photo-sensitizing agents have not been put into practical use.

We have now found that a combination of an aromatic carbonyl compound such as benzophenone and anthraquinone with a specific aliphatic carboxylic acid or a specific metal salt thereof can promote extremely the photo-degradability of polyolefins. Accordingly, if such combination is used for promoting the photo-degradability of polyolefins, it is possible to obtain polyolefin resinous compositions having a sufficient and satisfactory photo-degradability while maintaining amounts used of expensive carbonyl compounds having a poor compatibility with polyolefins to relatively low levels.

It is, therefore, a primary object of this invention to provide a polyolefin resin composition having an excellent photo-degradability inspite of a relatively small content of a carbonyl compound as the photo-sensitizing agent.

In accordance with this invention, there is provided a photo-degradable polyolefin resin composition comprising (A) a polyolefin and (B) a photo-degrading agent consisting of (a) at least one carbonyl compound expressed by the following formula:

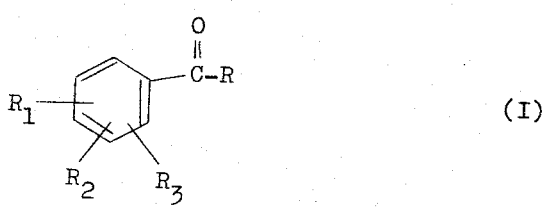

(I)

wherein R is a member selected from the group consisting of lower alkyl groups which may be substituted by halogen, lower alkoxy or nitro and which may be bonded to the carbon atom at the ortho-position of the benzene nucleus of formula (I) directly or via —CO— to form a fused ring, and groups expressed by the following formula

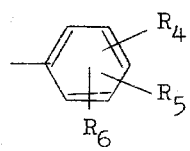

with the proviso that the carbon atom adjacent to the carbon atom bonded to —CO— in formula (I) may be bonded to the carbon atom at the ortho-position of the benzene nucleus of formula (I) directly or via —CO—; and $R_1$, $R_2$, $R_3$, $R_4$, $R_5$ and $R_6$, which may be the same or different, represent a member selected from the group consisting of hydrogen, halogen, hydroxyl, lower alkyl, lower alkoxy and nitro, with the proviso that when at least one of $R_1$, $R_2$, $R_3$, $R_4$, $R_5$ and $R_6$ is a hydroxyl group, said hydroxyl group is not bonded to the carbon atom of the benzene nucleus adjacent to the carbon atom of the benzene nucleus bonded to the —CO— group in formula (I):

and (b) at least one compound selected from the group consisting of aliphatic carboxylic acids, and zinc, magnesium, aluminum, calcium and barium salts of aliphatic carboxylic acids.

In the instant specification and claims, by the term "lower alkyl" are meant straight or branched alkyl groups having 1 to 6 carbon atoms, preferably 1 to 4 carbon atoms, such as methyl, ethyl, n-propyl, iso-propyl, n-butyl, sec-butyl and tert-butyl groups. Methyl and ethyl groups are especially preferred. By the term "lower alkoxy" are meant oxygen atom-containing aliphatic groups in which the alkyl group has 1 to 6 carbon atoms, preferably 1 to 4 carbon atoms, such as methoxy, ethoxy, n-propoxy, iso-propoxy, n-butoxy, sec-butoxy and tert-butoxy groups. Methoxy and ethoxy groups are especially preferred. The "halogen" includes fluorine, chlorine, bromine and iodine, and chlorine and bromine are preferred.

Although the mechanism according to which the photo-degrading agent of this invention consisting of a combination of the carbonyl compound of above formula (I) with the aliphatic carboxylic acid or its salt exhibits an excellent photo-degrading activity has not completely been elucidated, it is believed that this excellent activity will probably be due to the synergistic effect of both the components.

However, in compounds where the hydroxyl group as $R_1 - R_6$ is bonded to the carbon atom adjacent to the carbon atom of the benzene nucleus bonded to the —CO— group, for instance, 2-hydroxylbenzophenone, the hydrogen bond is formed in the molecule as is shown below:

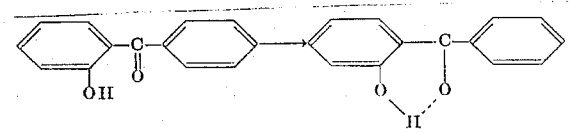

and the intended effect of promoting the photo-degradation cannot be attained, but on the contrary, such compounds exhibit an action of inhibiting the photo-degradation (namely an action of converting light energy to heat of other energy). Accordingly, the component (a) of the photo-degrading agent of this invention, i.e., the compound of above formula (I), does not include such compounds.

In case the photo-degrading agent of this invention consisting of the components (a) and (b) is used, the resulting photo-degrading effect is much higher than the effect attained by the single use of either of the components (a) and (b).

Typical instances of the carbonyl compounds of above formula (I) to be used as the component (a) of the photo-degrading agent of this invention are as follows:

1. Benzophenone compounds expressed by the following formula

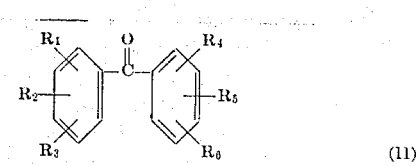

(II)

wherein $R_1$, $R_2$, $R_3$, $R_4$, $R_5$ and $R_6$ are as defined above.

Typical examples of the benzophenone compound of formula (II) are benzophenone, 4-chlorobenzophenone, 4-methylbenzophenone, 2-chlorobenzophenone, 4-bromobenzophenone, 3-hydroxybenzophenone, 4-hydroxybenzophenone, 2-methyl-4'-hydroxybenzophenone, 4-methyl-4'-hydroxybenzophenone, 3,5-dimethyl-4'-hydroxybenzophenone, 4,4'-dimethoxybenzophenone, 4-nitrobenzophenone, etc. Among these benzophenone compounds, there are preferably used benzophenone, 4-chlorobenzophenone, 4-methylbenzophenone, 2-chlorobenzophenone and 4-bromobenzophenone.

These benzophenone compounds are commercially available and possess a good compatibility with resins. Accordingly, these compounds are most preferably utilized in this invention. Further, since benzophenone compounds have, in general, a low toxicity, they are preferably used for resins utilized for uses requiring direct contact with foodstuffs, such as tablewares, food containers and packing materials for foods.

2. Anthraquinone compounds expressed by the following formula

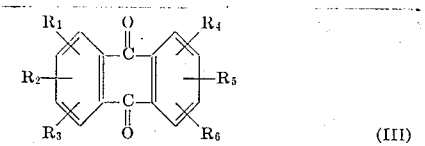

(III)

wherein $R_1$, $R_2$, $R_3$, $R_4$, $R_5$ and $R_6$ are as defined above.

The anthraquinone compounds are a little inferior to the above-mentioned benzophenone compounds with respect to the compatibility with polyolefins, but they exhibit a better photo-degrading activity than the benzophenone compounds. Typical examples of the anthraquinone compound expressed by formula (III) are anthraquinone, 2-methylanthraquinone, 2-ethylanthraquinone, 1-chloroanthraquinone, 2-chloroanthraquinone, 1-bromoanthraquinone, 2-bromoanthraquinone, etc. Anthraquinone, 2-methylanthraquinone, 2-ethylanthraquinone, 2-chloroanthraquinone and 2-bromoanthraquinone are especially preferred.

3. Phenylalkylketones expressed by the following formula

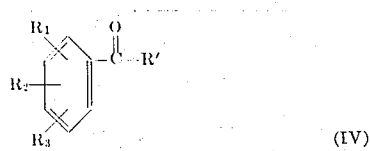

(IV)

wherein R' represents a lower alkyl group which may be substituted by halogen, and $R_1$, $R_2$ and $R_3$ are as defined above.

As the phenylalkylketone of formula (IV) there may be exemplified acetophenone, 3-bromoacetophenone, 4-bromoacetophenone, 2-methyl-4-chloroacetophenone, 3-methyl-4-chloroacetophenone, 3-methyl-4-bromoacetophenone, 2,4-dichloroacetophenone, 4-hydroxyacetophenone, 3-methyl-4-hydroxyacetophenone, 2,5-dimethyl-4-hydroxyacetophenone, 2-nitroacetophenone, 3-nitro-4-methylacetophenone, 3,5-dinitroacetophenone, propiophenone, 4-methylpropiophenone, 2,4-dichloropropiophenone, 4-bromopropiophenone, 3-methyl-4-chloropropiophenone, butyrophenone, 2,4-dichlorobutyrophenone, 4-hydroxybutyrophenone, 3-nitro-4-methylbutyrophenone, 2-nitroisobutyrophenone, 3-bromoisobutyrophenone, phenacyl bromide, phenacyl chloride, 4-bromophenacyl bromide, 4-chloro-phenacyl bromide, 2,5-dibromo-phenacyl bromide, 2,4,6-trichloro-phenacyl bromide, etc. Among them, acetophenone, 3-bromoacetophenone and 4-bromoacetophenone are preferred.

4. Indanone compounds expressed by the following formula

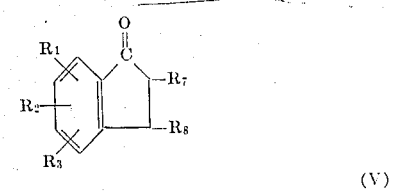

(V)

wherein $R_7$ and $R_8$, which may be the same or different, represent a member selected from the group consisting of hydrogen, halogen, lower alkyl, lower alkoxy and nitro, and $R_1$ and $R_2$ and $R_3$ are as defined above.

As the indanone compound of above formula (V), there may be exemplified indanone (sometimes called "hydrindone-(1)"), 6-chloroindanone, 2,2-dichloroindanone, 2,3-dichloroindanone, 3,3-dichloroindanone, 2-bromoindanone, 4-bromoindanone, 2,2-dibromoindanone, 2-methylindanone, 4-chloro-2-methylindanone, 6-chloro-2-methylindanone, 2-bromo-2-methylindanone, 4-methylindanone, 6-methylindanone, 4,7-dimethylindanone, etc. Among these indanone compounds, indanone, 2-bromoindanone, 2-methylindanone, 4-bromoindanone and 4-methylindanone are especially preferred.

5. Indanedione compounds expressed by the following formula

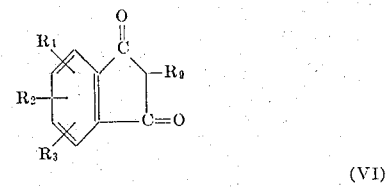

(VI)

wherein $R_3$ represents a member selected from the group consisting of hydrogen, halogen, lower alkyl, lower alkoxy and nitro, and $R_1$, $R_2$ and $R_3$ are as defined above.

As the indanedione compound of above formula (VI), there may be mentioned indanedione, 2-chloroindanedione, 2,2-dichloroindanedione, 2, 4, 5, 6, 7-pentachloroindanedione, 2-bromoindanedione, 2-chloro-2-bromoindanedione, 2,2-dibromoindanedione, 2-methylindanedione, 2-bromo-2-methylindanedione and 2,2-dimethylindanedione. Among them, indanedione, 2-chloroindanedione, 2-bromoindanedione and 2-methylindanedione are especially preferred.

Any of compounds expressed by above formulas (II) to (VI) is effective as the component (a) of the photo-degrading agent for polyolefin resins. However, use of benzophenone compounds of above formula (II) and anthraquinone compounds of above formula (III) is especially preferable because, as compared with other types of compounds, they are readily available at low costs and they exhibit good results in rendering polyolefin resins photo-degradable.

The foregoing carbonyl compounds may be used singly, or two or more of them may be incorporated into a polyolefin. Such carbonyl compound is incorporated into a polyolefin in an amount of at least 0.05 parts by weight per 100 parts by weight of the polyolefin. The upper limit of the amount incorporated of the carbonyl compound is not particularly critical in this invention, and the amount can be varied within a broad range appropriately depending on the kinds of the carbonyl compound and polyolefin, the compatibility between the carbonyl compound and polyolefin, the physical properties and manufacturing cost of the resulting resinous composition, etc. In general, it is preferred that the carbonyl compound is used in an amount of up to 10 parts by weight, especially 0.1 to 5 parts by weight, more especially 0.2 to 1 part by weight, per 100 parts by weight of the polyolefin. In other words, in this invention a sufficient photo-degrading effect can be attained even if the carbonyl compound is incorporated in such a small amount as not giving a practicably sufficient effect when used singly.

In this invention, the carbonyl compound of above formula (I) is used in combination with an aliphatic carboxylic acid and/or its metal salt.

Any aliphatic carboxylic acid that has a compatibility with the polyolefin and can be dispersed uniformly in the polyolefin can be used in this invention. In view of the compatibility with the polyolefin and low volatility, use of aliphatic carboxylic acids having at least 6 carbon atoms, especially at least 12 carbon atoms, is preferred. In view of the availability and easiness in handling, use of aliphatic carboxylic acids having not more than 20 carbon atoms is preferred. Either saturated or unsaturated aliphatic carboxylic acids may be used in this invention, but in view of chemical stability and easiness in handling, use of saturated aliphatic carboxylic acids is recommended.

As the carboxylic acid to be used in this invention, there may be exemplified aliphatic monocarboxylic acids such as caproic acid, enanthic acid, caprylic acid, pelargonic acid, undecylic acid, lauric acid, dodecylic acid, myristic acid, pentadecylic acid, palmitic acid, stearic acid, arachidic acid, behenic acid, lignoceric acid, undecylenic acid, oleic acid, elaidic acid, cetoleic acid, erucic acid, sorbic acid, linoleic acid, linolenic acid and ricinoleic acid; and aliphatic polycarboxylic acids such as adipic acid, pimelic acid, suberic acid, azelaic acid and sebacic acid.

Among these aliphatic carboxylic acids, stearic acid, palmitic acid, oleic acid, lauric acid and adipic acid are preferably used, and in view of the availability and the high activity, use of stearic acid is most preferred.

Zinc, magnesium, aluminum, calcium and barium are used as metals for forming metal salts of these aliphatic acids, and use of zinc is especially preferred. As the aliphatic carboxylic acid metal salt to be used as component (b) of the photo-degrading agent of this invention, there may be mentioned, for example, zinc stearate, zinc palmitate, zinc oleate, zinc laurate, magnesium stearate, magnesium palmitate, magnesium oleate, magnesium laurate, aluminum stearate, aluminum palmitate, aluminum oleate, aluminum laurate, calcium stearate, calcium palmitate, calcium oleate, calcium laurate, barium stearate, barium palmitate, barium oleate and barium laurate. Among these salts, zinc stearate is most preferred.

These aliphatic carboxylic acids or metal salts thereof can be incorporated singly or in the form of mixtures of two or more of them. The amount added of such component (b) is not particularly critical, as long as no bad influences are given to physical properties of polyolefins by incorporation of the component (b). However, in order to promote the photo-degradability of polyolefins synergistically with the component (a), namely a carbonyl compound of above formula (I), the component (b) is incorporated in a polyolefin in an amount of at least 0.05 parts by weight, preferably at least 0.1 parts by weight, per 100 parts by weight of the polyolefin. The upper limit of the amount used of the component (b) is not critical, and it can be varied within a broad range appropriately depending on the kind of the polyolefin, the compatibility between the component (b) and polyolefin, the mechanical strength of the resulting polyolefin resin composition and other factors. However, in case the component (b) is incorporated in too great an amount, the effect attained does not increase proportionally. Therefore, it is usually sufficient that the component (b) is incorporated in an amount of up to 10 parts by weight per 100 parts by weight of the polyolefin, and it is generally desirable that the component (b) is incorporated in an amount ranging from 0.5 to 2 parts by weight per 100 parts by weight of the polyolefin.

As described above, the photo-degrading agent of this invention consists of a carbonyl compound of above formula (I) [component (a)] and an aliphatic carboxylic acid or a metal salt thereof [component (b)]. In the photo-degrading agent of this invention, the ratio of the components (a) and (b) is not particularly critical and may be varied within a broad range appropriately depending on their compatibility with the polyolefin and the degree of the photo-degradability to be imparted to the polyolefin. In general, it is preferred to employ a photo-degrading agent consisting of 5 to 70 percent by weight, preferably 15 to 50 percent by weight, based on the photo-degrading agent, of the carbonyl compound [component (a)] and 30 to 95 percent by weight, preferably 50 to 85 percent by weight, based on the photo-degrading agent, of the aliphatic carboxylic acid or its metal salt [component (b)].

It is allowable and preferable to employ the carbonyl compound in an amount smaller than the amount of the aliphatic carboxylic acid or its metal salt.

As polyolefin resins to be provided with the photo-degradability by incorporation of the photo-degrading agent of this invention, there may be mentioned homopolymers obtained by polymerizing an olefin monomer having at least one double bond in the molecule, such as ethylene, propylene, 1-butene and 1,4-butadiene, and copolymers obtained by copolymerizing at least two of such olefin monomers or by copolymerizing a great amount of such olefin monomer with a small amount of other monomer compolymerizable therewith, such as vinyl acetate and vinyl chloride. Specific examples of such polymers are polyethylene, polypropylene, polybutylene, polybutadiene and an ethylene-propylene copolymer. These polymers can be molded into films, sheets, foams and other shaped articles, and are used in various fields. In this invention, use of polyethylene is especially preferred.

The amount of the photo-degrading agent to be incorporated into the polyolefin resin is not critical and can be varied within a broad range appropriately depending on the desired degree of the photo-degradation, the kind and properties of the polyolefin, the kinds and ratios of the components (a) and (b) constituting the photo-degrading agent, and other factors.

In order to attain a sufficient photo-degrading effect, it is generally preferred that the photo-degrading agent is incorporated in an amount of at least 0.2 parts by weight per 100 parts by weight of the polyolefin. In this invention, the photo-degrading agent can be incorporated in a great amount according to need. However, the incorporation of too great an amount of the photo-degrading agent does not result in the proportional increase of the photo-degrading effect but rather gives bad influences to the mechanical strength and other properties of the resulting resin composition. It is generally sufficient that the photo-degrading agent is incorporated in an amount of up to 10 parts by weight per 100 parts by weight of the polyolefin, and it is generally preferred that the amount of the photo-degrading agent ranges from 0.2 to 5 parts by weight, especially 0.5 to 3 parts by weight, per 100 parts by weight of the polyolefin.

Any method that can disperse the photo-degrading agent uniformly in a polyolefin resin can be used for formation of a photo-degradable polyolefin resin composition of this invention. For instance, it is possible to adopt a method comprising adding the above-mentioned amounts of the carbonyl compound and the aliphatic carboxylic acid or its salt to a polyolefin resin and homogenizing the blend by suitable mixing means such as mixing rolls and extrusion kneaders to obtain a homogeneous composition.

It will readily be understood that ordinary additives such as heat stabilizers, lubricants, fillers, pigments, high molecular substances, etc. can be incorporated in the polyolefin resin composition of this invention according to need. Further, it is also possible to incorporate customary foaming agents or foam-generating substances such as propane, butane, pentane, dichlorofluoromethane, azobisisobutyronitrile, etc. into the polyolefin resin. In this case, a foam having a multicellular structure can be formed from the composition of this invention.

The polyolefin resin composition of this invention can be shaped into articles of a desired configuration such as plates, sheets, films, tubes and various containers by conventional molding techniques. For instance, the composition is blended and kneaded by means of a mixing roll, a Banbury mixer, an extrusion kneader, etc., and molded by means of an injection molder, an extruder, a molding press, a calender roll, etc.

The polyolefin resin composition of this invention has such a property that it will readily be degraded and disintegrated by actions of sunlight and ultraviolet rays. Namely, when the composition is exposed to sunlight or ultraviolet rays, cross-linking is caused to occur among high molecules constituting the composition by actions of these rays at the initial stage, with the result that the composition is hardened and rendered brittle. In this manner, the degradation advances in the composition, and at the final stage, breakage of high molecules is caused, resulting in the reduction of the molecular weight, with the consequence that the composition becomes powdery. Therefore, when the polyolefin resin composition of this invention is left alone outdoors and exposed to sunlight or ultraviolet rays, the polymer component of the resin composition is deteriorated by an action of the photo-degrading agent incorporated in the resin and the degree of polymerization is therefore reduced. Although the degree of deterioration varies depending on the kind and polymerization degree of the polyolefin, the amount used of the photo-degrading agent, the season and other factors, when the composition of this invention is left alone outdoors for a period of about several months, preferably 3 to 6 months, the composition molded to have a definite configuration is deteriorated to such a degree that the spontaneous disintegration is allowed to occur in the composition.

The mechanism according to which the photo-degrading agent of this invention operates has not been elucidated completely, but it is deemed that such excellent effect may be attained by the following actions of the carbonyl compound and the aliphatic carboxylic acid or its salt which proceed simultaneously; i) the taking-out of hydrogen from the polymer chain by the sunlight energy of the carbonyl compound and the subsequent autoxidation, and ii) the action of the carboxylic acid or its salt for promoting the crystallization of the polyolefin. More specifically, the degradation of the polyolefin starts with the taking-out of hydrogen by the carbonyl compound, and the cross-linking of the polymer and the breakage of the polymer chain by oxidation advance simultaneously. At the final stage the polymer is converted to a low-molecular-weight polymer resembling paraffin. In case the aliphatic carboxylic acid or its salt is made co-present with the carbonyl compound, it participates more or less in oxidation of the polymer molecular and at the same time it acts as a nucleus-forming agent promoting the disintegration of the polymer molecule. Although the reason has not been known, the polyolefin has such a tendency that as the crystallization of the polyolefin proceeds, the polymer becomes readily degradable by the taking-out of hydrogen. Thus, it is considered that such actions of the carbonyl compound and the carboxylic acid or its salt are simultaneously exerted on the polyolefin and the degradation of the polyolefin may be promoted.

The photo-degradable polyolefin resin composition of this invention can be used in the form of a molded foam or an unfoamed molded article in the fields where ordinary polyolefin resins are used, and especially when it is applied to the "throw-away" uses, for instance, as packaging sheets and films, packing cases absorbing shocks during transportation, tablewares, agricultural films, etc., its characteristic properties are fully exerted. Namely, after these articles have been used, if they are left along outdoors, they are spontaneously degraded and disintegrated. Therefore, unlike conventional synthetic resin articles, they do not damage or mar the environment or scenery and such disposal treatments as recovery and burning can be omitted.

When the photo-degrading agent of this invention consisting of a carbonyl compound of above formula (I) and an aliphatic carboxylic acid or its metal salt is used, a prominent synergistic effect such as not expected from the single use of either of the two components can be attained. Therefore, the amount of a carbonyl compound such as benzophenone and anthraquinone, which involves, as described above, problems of a poor compatability with polyolefins, an undesirable smell and a high cost, can be reduced to a great extent.

This invention will now be illustrated by reference to Examples.

EXAMPLE 1

A mixture of 100 parts by weight of a low density polyethylene having a molecular weight of 23,900, 1 part by weight of benzophenone and 2 parts by weight of zinc stearate was dissolved in xylene, and a film having a thickness of 50 μ was prepared from this xylene solution by the casting method.

This film was exposed for 300 hours to ultraviolet rays omitted from a high voltage mercury lamp disposed 30 cm apart from the film. After the irradiation, the film was so brittle that it was readily powdered by crumbling with fingers, and the molecular weight of the film was 2620 after the irradiation. After the irradiation had been continued for 500 hours, the molecular weight was reduced to 1670.

For comparison, films prepared from a composition consisting of 100 parts by weight of the above polyethylene and 1 part by weight of benzophenone (control 1), a composition consisting of 100 parts by weight of the above polyethylene and 2 parts by weight of zinc stearate (control 2) and a film composed merely of the above polyethylene (blank) were exposed for 500 hours to ultraviolet rays in the same manner as above. After the irradiation, the molecular weights of the films of controls 1 and 2 were found to be 8920 and 4050, respectively. In the case of the blank film, the measurement of the molecular weight was impossible after 500 hours' irradiation, because about 8 percent of the film was insoluble for a solvent (hot xylene) used for the measurement of the molecular weight. After 700 hours of irradiation, it was found that the molecular weight was 9780.

EXAMPLE 2

Procedures of Example 1 were repeated by employing, instead of benzophenone and zinc stearate, a carbonyl compound and an aliphatic carboxylic acid or its salt as illustrated in Table 1 in amounts also shown in Table 1. Results obtained are also shown in Table 1.

Table 1

| Run No. | Photo-Degrading Agent (per 100 parts by weight of polyethylene) | | Molecular Weight | |
|---|---|---|---|---|
| | Component (a) | Component (b) | after 500 hours' irradiation | after 700 hours' irradiation |
| 1 | benzophenone (1 part by weight) | zinc stearate (1 part by weight) | 2980 | — |
| 2 | benzophenone (1 part by weight) | stearic acid (1 part by weight) | 5750 | — |
| 3 | 2-methylanthraquinone (1 part by weight) | zinc stearate (1 part by weight) | 1550 | — |
| 4 | benzophenone(0.5 part by weight) and 2-methylanthraquine (0.5 part by weight) | zinc stearate(0.5 part by weight) and stearic acid(0.5 part by weight) | 2750 | — |
| 5 | benzophenone (2 parts by weight) | — | 6100 | — |
| 6 | — | zinc stearate (2 parts by weight) | 4050 | — |
| 7 | — | stearic acid (2 parts by weight) | 8070 | — |
| 8 | 2-methylanthraquinone(2 parts by weight) | — | 4720 | 3400 |
| 9 | — | — | measurement was impossible because of presence of solvent-insoluble portions | 9780 |
| 10 | 2-methylanthraquinone(1 part by weight) | aluminum palmitate (1 part by weight) | — | 2850 |
| 11 | 2-methylanthraquinone(1 part by weight) | barium stearate (1 part by weight) | — | 2950 |
| 12 | 2-methylanthraquinone (1 part by weight) | adipic acid(1 part by weight) | — | 3150 |
| 13 | indanedione(1 part by weight) | magnesium stearate (1 part by weight) | — | 2450 |
| 14 | indanone(1 part by weight) | calcium stearate (1 part by weight) | — | 4980 |
| 15 | — | aluminum palmitate (2 parts by weight) | — | 7820 |
| 16 | — | barium stearate (2 parts by weight) | — | 8500 |
| 17 | — | adipic acid(2 parts | — | 9050 |

Table 1—Continued

| Run No. | Photo-Degrading Agent (per 100 parts by weight of polyethylene) | | Molecular Weight | |
|---|---|---|---|---|
| | Component (a) | Component (b) | after 500 hours' irradiation | after 700 hours' irradiation |
| 18 | indanedione(2 parts by weight) | by weight) — | — | 4690 |
| 19 | indanone(2 parts by weight | — | — | 5630 |
| 20 | — | magnesium stearate (2 parts by weight) | — | 4800 |
| 21 | — | calcium stearate(2 parts by weight) | — | 8700 |

EXAMPLE 3

Procedures of Example 1 were repeated by varying the amounts of benzophenone and zinc stearate as illustrated in Table 2 to obtain results shown in Table 2.

Table 2

| Run No. | Amounts of Photo-Degrading Agent (per 100 parts by weight of polyethylene) | | Molecular Weight | |
|---|---|---|---|---|
| | Benzophenone | Zinc stearate | after 500 hrs irradiation | after 700 hrs irradiation |
| 22 | 0.1 | 0.1 | — | 7730 |
| 23 | 0.2 | 0.3 | — | 6150 |
| 24 | 0.5 | 0.5 | — | 4650 |
| 25 | 1.0 | 1.0 | — | 1740 |
| 26 | 0.1 | — | — | 9050 |
| 27 | — | 0.1 | — | 9020 |
| 28 | 0.2 | — | — | 8180 |
| 29 | — | 0.3 | — | 7780 |
| 30 | 0.5 | — | — | 7350 |
| 31 | — | 0.5 | — | 6810 |
| 32 | 1.0 | — | 8920 | 6500 |
| 33 | — | 1.0 | — | 5150 |
| 34 | 1.0 | 0.1 | 8550 | — |
| 35 | 1.0 | 0.5 | 6520 | — |
| 36 | 1.0 | 0.7 | 4400 | — |

EXAMPLE 4

Procedures of Example 1 were repeated by employing, instead of benzophenone and zinc stearate, a carbonyl compound and an aliphatic carboxylic acid or its salt as indicated in Table 3 in amounts also indicated in Table 3. Results obtained are shown in Table 3.

EXAMPLE 5

100 Parts by weight of a polypropylene for extrusion molding having a melt index of 3 (Ube Polypropylene E-103D manufactured by Ube Kosan Kabushiki Kaisha) was incorporated with 0.1 part by weight of benzophenone and 0.5 part by weight of zinc stearate, and the blend was mixed and kneaded by means of a hot roll to obtain a sheet having a thickness of 0.5 mm. When the resulting sheet was exposed for 57 hours to rays emitted from a 400 W high pressure mercury lamp disposed 30 cm apart from the sheet, the sheet was broken by bending it once.

For comparison, sheets were similarly prepared by adding to the polypropylene 0.1 part by weight of benzophenone (control 3) or 0.5 part by weight of zinc stearate (cotrol 4) or without addition of any photo-degrading agent (blank). The irradiation time required for degrading the sheet so that it could be broken by bending it once was 79 hours in the case of control 3, 69 hours in the case of control 4 and 91 hours in the case of the blank sheet.

It is claimed:

1. A photo-degradable polyolefin comprising (A) a polyolefin and (B) 0.2 to 10 parts by weight per 100 parts by weight of said polyolefin, of a photo-degrading agent consisting of (a) 5 to 70% by weight, based on the photo-degrading agent of, at least one carbonyl compound expressed by the following formula

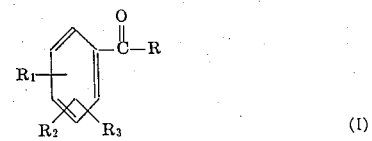

(I)

Table 3

| Run No. | Photo-Degrading Agent(per 100 parts by weight of polyethylene) | | Molecular Weight | |
|---|---|---|---|---|
| | Component(a) | Component (b) | after 300 hours' irradiation | after 500 hours' irradiation |
| 37 | 2-methylanthraquinone(1 part by weight) | zinc stearate (2 parts by weight) | 2750 | 1500 |
| 38 | benzophenone(1 part by weight | adipic acid(2 parts by weight) | — | 7160 |
| 39 | benzophenone(0.5 part by weight) | magnesium stearate (3 parts by weight) | 8850 | — |
| 40 | benzophenone(0.5 part by weight) | — | — | 10500 |
| 41 | — | magnesium stearate (3 parts by weight) | — | 9850 |
| 42 | indanedione-1,3 (1 part by weight) | zinc laurate(2 parts by weight) | — | 3950 |
| 43 | indanedion-1,3 (1 part by weight) | — | — | 7930 |
| 44 | 2-methylanthraquinone(1 part by weight) | calcium stearate (2 parts by weight) | — | 6980 | wherein R is a member selected from the group consisting of lower alkyl groups which may be substituted by halogen, lower alkoxy or nitro and which may be bonded to the carbon atom at the ortho-position of the benzene nucleus of formula (I) directly or via —CO— to form a fused ring, and groups expressed by the following formula

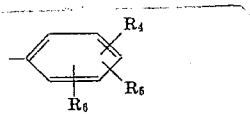

with the proviso that the carbon atom adjacent to the carbon atom bonded to —CO— in formula (I) may be bonded to the carbon atom at the ortho-position of the benzene nucleus of formula (I) directly or via —CO—; and $R_1$, $R_2$, $R_3$, $R_4$, $R_5$ and $R_6$, which may be the same or different, represent a member selected from the group consisting of hydrogen, halogen, hydroxyl, lower alkyl, lower alkoxy and nitro, with the proviso that when at least one of $R_1$, $R_2$, $R_3$, $R_4$, $R_5$ and $R_6$ is a hydroxyl group, said hydroxyl group is not bonded to the carbon atom of the benzene nucleus adjacent to the carbon atom of the benzene nucleus bonded to the —CO— group in formula (I):
and (b) 30 to 95 percent by weight, based on the photo-degrading agent, of at least one compound selected from the group consisting of aliphatic carboxylic acids having 6 to 20 carbon atoms, and zinc, magnesium, aluminum, calcium and barium salts of said aliphatic carboxylic acids.

2. A photo-degradable polyolefin resin composition as set forth in claim 1 wherein the polyolefin is polyethylene or polypropylene.

3. A photo-degradable polyolefin resin composition as set forth in claim 1 wherein the photo-degrading agent is present in an amount of 0.5 to 3 parts by weight per 100 parts by weight of the polyolefin.

4. A photo-degradable polyolefin resin composition as set forth in claim 1 wherein the carbonyl compound is a benzophenone compound expressed by the following formula

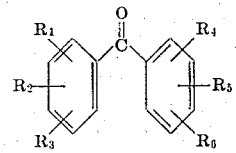

wherein $R_1$, $R_2$, $R_3$, $R_4$, $R_5$ and $R_6$ are as defined in claim 1.

5. A photo-degradable polyolefin resin composition as set forth in claim 4 wherein the benzophenone compound is benzophenone, 4-chlorobenzophenone, 4-methylbenzophenone, 2-chlorobenzophenone, 4-bromobenzophenone, 3-hydroxybenzophenone, 4-hydroxybenzophenone, 2-methyl-4'-hydroxybenzophenone, 4-methyl-4'-hydroxybenzophenone, 3,5-dimethyl-4'-hydroxybenzophenone, 4,4'-dimethoxybenzophenone or 4-nitrobenzophenone.

6. A photo-degradable polyolefin resin composition as set forth in claim 1 wherein the carbonyl compound is an anthraquinone compound expressed by the following formula

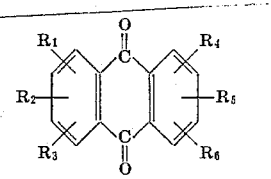

wherein $R_1$, $R_2$, $R_3$, $R_4$, $R_5$ and $R_6$ are as defined in claim 1.

7. A photo-degradable polyolefin resin composition as set forth in claim 6 wherein the anthraquinone compound is anthraquinone, 2-methylanthraquinone, 2-ethylanthraquinone, 1-chloroanthraquinone, 2-chloroanthraquinone, 1-bromoanthraquinone or 2-bromoanthraquinone.

8. A photo-degradable polyolefin resin composition as set forth in claim 1 wherein the carbonyl compound is a phenylalkylketone expressed by the following formula

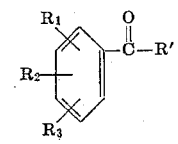

wherein $R_1$, $R_2$ and $R_3$ are as defined in claim 1 and R' represents a lower alkyl group which may be substituted by halogen.

9. A photo-degradable polyolefin resin composition as set forth in claim 8 wherein the phenylalkylketone is acetophenone, 3-bromoacetophenone, 4-bromoacetophenone, 2-methyl-4-chloroacetophenone, 3-methyl-4-chloroacetophenone, 3-methyl-4-bromoacetophenone, 2,4-dichloroacetophenone, 4-hydroxyacetophenone, 3-methyl-4-hydroxyacetophenone, 2,5-dimethyl-4-hydroxyacetophenone, 2-nitroacetophenone, 3-nitro-4-methylacetophenone, 3,5-dinitroacetophenone, propiophenone, 4-methylpropiophenone, 2,4-dichloropropiophenone, 4-bromopropiophenone, 3-methyl-4-chloropropiophenone, butyrophenone, 2,4-dichlorobutyrophenone, 2,4-dichlorobutyrophenone, 4-hydroxybutyrophenone, 3-nitro-4-methylbutyrophenone, 2-nitroisobutyrophenone, 3-bromoisobutyrophenone, phenacyl bromide, phenacyl chloride, 4-bromophenacyl bromide, 4-chlorophenacyl bromide, 2,5-dibromophenacyl bromide or 2,4,6-trichlorophenacyl bromide.

10. A photo-degradable polyolefin resin composition as set forth in claim 1 wherein the carbonyl compound is an indanone compound expressed by the following formula

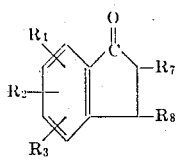

wherein $R_1$, $R_2$ and $R_3$ are as defined in claim 1 and $R_7$ and $R_8$, which may be the same or different, represent a member selected from the group consisting of hydrogen, halogen, lower alkyl, lower alkoxy and nitro.

11. A photo-degradable polyolefin resin composition as set forth in claim 10 wherein the indanone compound is indanone, 6-chloroindanone, 2,2-dichloroindanone, 2,3-dichloroindanone, 3,3-dichloroindanone, 2-bromoindanone, 4-bromoindanone, 6-bromoindanone, 2,2-dibromoindanone, 2-methylindanone, 4-chloro-2-methylindanone, 6-chloro-2-methylindanone, 2-bromo-2-methylindanone, 4-methylindanone, 6-methylindanone or 4,7-dimethylindanone.

12. A photo-degradable polyolefin resin composition as set forth in claim 1 wherein the carbonyl compound is an indanedione compound expressed by the following formula

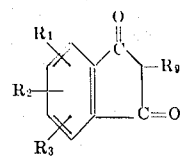

wherein $R_1$, $R_2$ and $R_3$ are as defined in claim 1 and $R_9$ represents a member selected from the group consisting of hydrogen, halogen, lower alkyl, lower alkoxy and nitro.

13. A photo-degradable polyolefin resin composition as set forth in claim 12 wherein the indanedione compound is indanedione, 2-chloroindanedione, 2,2-dichloroindanedione, 2,4,5,6,7-pentachloroindanedione, 2-bromoindanedione, 2-chloro-2-bromoindanedione, 2,2-dibromoindanedione, 2-methylindanedione, 2-bromo-2-methylindanedione or 2,2-dimethylindanedione.

14. A photo-degradable polyolefin resin composition as set forth in claim 1 wherein the aliphatic carboxylic acid is stearic acid, palmitic acid, oleic acid, lauric acid or adipic acid.

15. A photo-degradable polyolefin resin composition as set forth in claim 1 wherein the aliphatic carboxylic acid salt is zinc stearate.

* * * * *